(12) United States Patent
Giraut Ruso et al.

(10) Patent No.: US 8,982,590 B2
(45) Date of Patent: Mar. 17, 2015

(54) SOLAR GENERATION METHOD AND SYSTEM

(75) Inventors: Elizabeth Giraut Ruso, Sarriguren (ES); María A. Padrós Razquin, Sarriguren (ES); Carlos Itoiz Beunza, Sarriguren (ES)

(73) Assignee: Acciona Energia, S.A., Sarriguren (ES)

( * ) Notice: Subject to any disclaimer, the term of this patent is extended or adjusted under 35 U.S.C. 154(b) by 326 days.

(21) Appl. No.: 13/501,979

(22) PCT Filed: Oct. 14, 2009

(86) PCT No.: PCT/ES2009/070438
§ 371 (c)(1),
(2), (4) Date: Jun. 26, 2012

(87) PCT Pub. No.: WO2011/045447
PCT Pub. Date: Apr. 21, 2011

(65) Prior Publication Data
US 2012/0262960 A1    Oct. 18, 2012

(51) Int. Cl.
  *H02M 7/48*    (2006.01)
  *H02J 1/10*    (2006.01)
  *H01J 3/38*    (2006.01)
  (Continued)

(52) U.S. Cl.
  CPC . *H01J 3/385* (2013.01); *H02J 3/16* (2013.01); *H02J 3/383* (2013.01); *H02J 3/48* (2013.01); *H02J 3/50* (2013.01); *Y02E 10/563* (2013.01); *Y02E 10/58* (2013.01); *Y02E 40/34* (2013.01); *Y10S 323/906* (2013.01)

USPC ............................. 363/71; 323/906; 363/65

(58) Field of Classification Search
  USPC ....................... 323/906, 65; 363/71
  See application file for complete search history.

(56) References Cited

U.S. PATENT DOCUMENTS 3,384,806 A * 5/1968 Hartman ................... 322/2 R
6,046,919 A * 4/2000 Madenokouji et al. ......... 363/98
(Continued)

OTHER PUBLICATIONS

Azevedo, et al., Photovoltaic Inverters with Fault Ride-Through Capability, IEEE International Symposium on Industrial Electronics, 2009, Jul. 5, 2009, pp. 549-553, XP031518471.

(Continued)

*Primary Examiner* — Emily P Pham
(74) *Attorney, Agent, or Firm* — Blank Rome LLP

(57) ABSTRACT

The invention describes a solar generation method by means of a system (1) comprising a set of solar cells (2) connected to an inverter (4) that transmits the energy generated to an electrical network (6), which comprises controlling the active and reactive power that the system (1) transmits to the electrical network (6) by controlling the voltage ($V_{cell}$) of the cells (2) and the output current ($I_{inv}$) of the inverter (4), such that: in a first mode of operation, the voltage ($V_{cell}$) of the cells (2) provides the maximum active power in accordance with the operating conditions; and, in a second mode of operation, the voltage ($V_{cell}$) in the cells (2) is different from the voltage that provides the maximum active power, generating an active power that is lower than the maximum, in order to optimise the integration of the solar generation system (1) into the electrical network (6).

17 Claims, 4 Drawing Sheets

(51) Int. Cl.
*H02J 3/16* (2006.01)
*H02J 3/38* (2006.01)
*H02J 3/48* (2006.01)
*H02J 3/50* (2006.01)

(56) References Cited

U.S. PATENT DOCUMENTS

| 7,324,361 B2* | 1/2008 | Siri | 363/95 |
| 2008/0036440 A1* | 2/2008 | Garmer | 323/299 |
| 2011/0043160 A1* | 2/2011 | Serban | 320/101 |

OTHER PUBLICATIONS

Mastromauro, et al., A Single-Phase Voltage Controlled Grid Connected Photovoltaic System with Power Quality Conditioner Functionality, Dec. 9, 2008, URL: http://vbn.aau.dk/files/16279906/A__single-phase_voltage_controlled_grid_connected_photovoltaic_system_with_power_quality_conditioner_functionality.pdf, XP-002595331, p. 1-9.

Xiang, et al., A Two-Stage PV Grid-Connected Inverter with Optimized Anti-islanding Protection Method, Sustainable Power Generation and Supply, 2009. Supergen '09. International Conference On, IEEE, Piscataway, NJ, USA, Apr. 6, 2009, pp. 1-4.

* cited by examiner

SOLAR GENERATION METHOD AND SYSTEM

This application is the U.S. national phase of International Application No. PCT/ES2009/070438, filed Oct. 14, 2009.

OBJECT OF THE INVENTION

The present invention belongs in the field of renewable energies and, more specifically, to the production, conversion or distribution of electrical energy in photovoltaic solar energy plants.

The main object of the present invention is a solar generation method that has two modes of operation, one that makes it possible to obtain the maximum energy production for each operating condition, and another which allows for the integration of the photovoltaic plants in electrical systems. Furthermore, a system capable of performing said method is also disclosed.

BACKGROUND OF THE INVENTION

In this document, the term "electrical network" will normally be used to refer to any general electrical system whereto a photovoltaic system is connected. Currently, photovoltaic systems connected to the network are becoming a standard electrical energy generation technology in developed countries. They began, a few years ago, as de-centralised, isolated direct current installations, and, today, photovoltaic modules combined with inverters represent one of the mature electrical generation technologies in a future environment of large-scale renewable generation.

Said photovoltaic systems are composed of a set of solar panels that supply an inverter equipment (DC/AC converter), with or without a transformer, which is connected to the electrical network through a meter that makes it possible to determine the energy supplied by the installation. In some cases, the inverter equipment may include a DC/DC converter.

The inverter equipment usually operates at a variable power, seeking at all times the maximum output power point. Said power is dependent on the energy that reaches the inverter from the solar panels and, therefore, from the irradiance conditions, and the temperature. On the other hand, the inverter is automatically disconnected when the energy supplied thereto is below a given value, that is, when the irradiance is weak, below a given threshold.

In the event that the inverter includes a DC/DC converter, the latter will adapt the voltage provided by the panels to a constant value that will supply the DC/AC converter, which will always automatically operate with the same input voltage. Sometimes an accumulator or battery bank is used in the photovoltaic system in order to store the energy produced during the day, which is used at night and during cloudy periods. A load regulator controls the system operativity and the current flow to and from the battery in order to protect it against overcharge, overdischarge, etc.

Currently, there are two development fronts in regards to photovoltaic solar energy: in the first place, maximising energy production and, in the second place, allowing for the network integration of photovoltaic plants. Due to the growth of renewable energies, it is necessary for photovoltaic plants to be able to provide services to the network and contribute to the stability thereof; for this reason, it is increasingly necessary, and the more so in large photovoltaic plants, to solve the problem of their integration into the electrical network.

DESCRIPTION OF THE INVENTION

It is a well-known fact that the active power generated by a solar cell is a function of the voltage of said cell. FIG. 1 shows a graph of the power and the intensity of a solar panel against the voltage, where it may be observed that the power is at a maximum at a given voltage that is dependent on the atmospheric conditions (temperature and solar irradiation). Currently, as mentioned above, the operating methods of solar generation systems are limited to constantly finding the maximum active power generation point. However, contingencies in the electrical network may occasionally make it advisable to reduce the active power generated and increase the reactive power.

The inventors of this application have discovered that an adequate control of the inverter of a solar cell, taking into consideration the shape of the P-V curve, makes it possible to control the active power and the reactive power that are transmitted to the electrical network, thereby contributing to network stability in accordance with the conditions thereof at each time.

In accordance with a first aspect of the invention, an operating method for a solar generation system is disclosed, where the system comprises at least one set of solar cells connected to an inverter that transmits the energy generated to an electrical network. Although it is not expressly mentioned in this description, it is understood that the parameters that determine the inverter's behaviour will be controlled by means of an inverter controller. This controller may be implemented as a separate unit in the inverter, or be integrated therein. Thus, the method comprises controlling the active and reactive power that the system transmits to the electrical network by controlling the voltage of the solar cells and the inverter output current, such that, in a first mode of operation, the voltage of the solar cells provides the maximum active power, whereas, in a second mode of operation, the voltage in the solar cells provides an active power that is lower than the maximum.

In order to illustrate the method of the invention, FIG. 2 shows a phase diagram where each vector corresponds to a given apparent power, which is respectively broken down into the sum of the vectors of the active power (abscissa axis) and the reactive power (ordinate axis). The apparent power transmitted by the solar generation system to the electrical network is the product of the voltage by the intensity.

$$S = V_{net} \cdot I_{inv}$$

At the generation system output, the voltage is fixed, through the inverter, by the network voltage ($V_{net}$), whereas the intensity ($I_{inv}$) may be controlled by means of the inverter. The inverter is designed with a maximum output current ($I_{invMAX}$) and, consequently, at each time there is an available apparent power $S_{avail}$ that is dependent on the maximum output current and the network voltage.

$$S_{avail} = V_{net} \cdot I_{invMAX}$$

Consequently, assuming that the network voltage ($V_{net}$) is kept constant, as drawn in FIG. 2 and FIG. 5:

variations in the output intensity ($I_{inv}$) of the inverter correspond to variations in the radius of the circumference that represents the apparent power, and the limits set by a circumference with radius $S_{avail}$ may not be exceeded. FIG. 2 shows that a decrease in the output intensity of the inverter makes the apparent power generated go from $S_A$ to $S_B$.

variations in the active power generated by the solar cells, by controlling the voltage ($V_{cell}$) of said cells, correspond to variations in the angle of the vector that represents apparent power S, S remaining constant and, therefore, the end of the vector remaining in the same circumference. FIG. 2 shows that an increase in the voltage of the cells makes the apparent power generated go from $S_A$ to $S_C$.

However, in a real case, the network voltage ($V_{net}$) may not remain constant. In this case, in order for a photovoltaic system to contribute to the stability of the electrical network, it must supply a reactive power that is determined by the operator requirements and by said network voltage and frequency. On the other hand, the maximum reactive power ($Q_{MAX}$) that may be supplied is determined by the available apparent power ($S_{avail}$) and the active power ($P_{cell}$) from the cells transmitted by the inverter:

$$Q_{MAX} = \sqrt{S_{avail}^2 - P_{cell}^2}$$

If the maximum reactive power ($Q_{MAX}$) is lower than the reactive power required to support the network, it is possible to increase said maximum reactive power ($Q_{MAX}$) by decreasing the active power by controlling the voltage in the cells. Since the network voltage is variable and, as described above, affects the available apparent power ($S_{avail}$), the comparison between the reactive power required and the maximum reactive power that may be generated must be regularly performed. This will be explained in more detail further below in this document by means of specific examples.

In sum, the method of the invention comprises two modes of operation:

A first mode of operation, where the voltage applied to the solar cells provides the maximum active power. This mode of operation approximately corresponds to the methods disclosed in the prior state of the art, where maximum power tracking, i.e. tracking of the maximum active power point of the solar cells, is performed as the irradiance and temperature conditions change.

A second mode of operation, where the voltage applied to the solar cells is different from, preferably greater than, the voltage providing the maximum active power.

Increasing the voltage in order to decrease the power generated, instead of reducing it, has the advantage of involving lower intensities through the different devices that make up the system, thereby reducing the heating thereof and increasing their useful life. Another advantage is that the system is more stable if a capacitor (or condenser) is connected in parallel between the solar cells and the inverter. A sudden decrease in the active power generated by the solar cells will cause the condenser to become discharged, thereby decreasing the voltage, which consequently will come close to the maximum power voltage and the power generated by the solar cells will once again increase. Therefore, in this preferred embodiment, the operating area of the generation system will be located from the maximum power point toward the right in the P-V curve, as shown in FIG. 1.

In accordance with a preferred embodiment of the invention, switching from the first mode of operation to the second mode of operation comprises charging a capacitor arranged in parallel between the solar cells and the inverter, using, to this end, a part of the active power generated by the solar cells.

Likewise, switching from the second mode of operation to the first mode of operation preferably comprises discharging the capacitor, which transmits part of the energy stored to the electrical network through the inverter.

Therefore, the method described makes it possible for the solar cells to generate the maximum possible power in accordance with the operating conditions in the first mode of operation, and switches to the second mode of operation in response to different contingencies in the electrical network.

Thus, switching to the second mode of operation will preferably take place when one of the following contingencies is detected:

an increase in the electrical network frequency above a pre-established threshold value;

a derivative of the electrical network frequency with respect to time that is above a pre-established threshold value;

an electrical network voltage that is outside a pre-established range;

isolated operation.

Another preferred embodiment of the invention is aimed at a control method for a generation plant formed by a plurality of solar generation systems by means of a central control unit. In this case, the central control unit sends signals to the different inverter controllers, determining the mode of operation of each on the basis of the network conditions. Depending on the needs, it is possible for some of the solar generation systems to operate in the first mode of operation and for others to operate in the second mode of operation.

A second aspect of the invention relates to a solar generation system that is capable of performing the method described above, comprising:

A set of solar cells connected to an inverter, which in turn transmits the energy generated to an electrical network.

A condenser connected in parallel between the inverter and the solar cells, the charging and discharging whereof makes it possible to control the voltage applied to solar cell terminals. In this document, it is understood that this condenser may be a single condenser or a battery of condensers.

An inverter control unit controls the voltage of the solar cells and the output intensity of the inverter, in such a way that the system has a first mode of operation where the voltage ($V_{cell}$) of the condenser provides the maximum possible active power in accordance with the operating conditions at each time; and a second mode of operation where the voltage ($V_{cell}$) of the condenser is different from, preferably greater than, that corresponding to the maximum possible active power, thereby generating an active power that is lower than the maximum in order to optimise the integration of the solar generation system into the electrical network.

Preferably, the generation system additionally comprises a set of sensors that provide information about the electrical network condition and the solar cells to the inverter control unit.

Furthermore, another particular embodiment of the invention comprises energy storage devices and, preferably, also a storage controller that co-ordinates the storage devices' charging and discharging operations, which may be electrical, chemical (batteries, hydrogen batteries, etc.), mechanical (flywheels, pumping of water, compressed air, etc.) devices. It is understood that the presence of storage devices in the system of the invention opens numerous possibilities in regards to the operation thereof. For example, the energy generated by the solar cells may be used, in whole or in part, to charge the storage devices. Moreover, under certain conditions, the storage devices may supply energy to the network in addition to that generated by the solar cells.

The operation of the solar cells may also be co-ordinated by means of controllable loads, understanding an active charge to mean any type of charge susceptible to being controlled in order to bear a variable supply, for example, electrolysis equipment. Another example of an active charge is an installation designed to de-salt seawater. By co-ordinating the energy production of the solar cells with the consumption of controllable loads, a net energy generation may be obtained that has a lower variability. In this case, there will also be an active charge controller to co-ordinate the supply operations for active or manageable charges (those susceptible to bearing a variable supply).

Another embodiment of the invention is aimed at a solar generation plant comprising a set of solar generation systems such as those described above, and which, moreover, comprises a central control unit that is connected to the inverter control units in order to transmit respective operation signals thereto on the basis of the electrical network conditions or the network operator requirements. A plant such as this may maximise energy production whenever possible and, moreover, provide additional services to the network when the latter so requires. Some of these services may be obtained by simultaneously combining, in the plant, solar generation systems operating in the first mode with other systems operating in the second mode.

Preferably, in a solar generation plant, some systems are made to operate in the second mode of operation when the following contingencies occur:
  a limitation of the maximum power to be generated by the generation plant, caused, for example, by a limited capacity in the interconnection line, which may be permanent or transitory;
  a reduction in the power generated by the plant with respect to the maximum power that it could generate, due to a requirement from the network operator. In this case, a power reserve is available and, in the event of a reduction in the network frequency, the plant may increase the power generated, thereby contributing to restore normal network operation.

In order to face the contingencies described above, the central control unit will preferably send power limitation signals and/or power reduction signals to the inverter controllers. The solar generation systems will reduce the power generated, switching from the first to the second mode of operation, if they receive a power limitation signal or if they generate a power that is greater than the power limitation signal.

The signals may be different for each of the generation systems, which results in advantageous features for the solar generation plant. For example, when a solar generation plant is required to maintain a power reduction with respect to the maximum power that it could generate (available active power) for a period of time, it is difficult to find out the current available active power value when said active power is being limited. Said available active power is variable and is dependent on at least the temperature, the solar irradiation and the dirt accumulated in the cells.

In order to resolve the difficulty described above, the present invention proposes a mode of operation in the solar generation plant whereby some systems are in the first mode of operation and others are in the second mode of operation, and the maximum production that the entire plant (the available active power) could generate is estimated on the basis of the active power generated by the former; the active power signal for the rest of the systems is established on the basis of this value, such that the total power generated by the plant meets the active power limitation requirement.

Moreover, on the basis of the evolution of the calculated available power, signals may be sent from the control unit in order to smooth the derivatives thereof: if a cloud enters the solar field, the systems in the first mode of operation will quickly reduce the active power generated, and the calculated available power will also decrease. In order to compensate for this effect, the central control unit may send signals to the systems operating in the second mode of operation so that they increase the power generated. In this manner, the variations in power are smoothed.

DESCRIPTION OF THE DRAWINGS

In order to complement the description being made and contribute to a better understanding of the characteristics of the invention, in accordance with a preferred practical embodiment example thereof, a set of drawings is attached as an integral part of said description, where the following has been represented for illustrative, non-limiting purposes.

PREFERRED EMBODIMENT OF THE INVENTION

Figure 1:
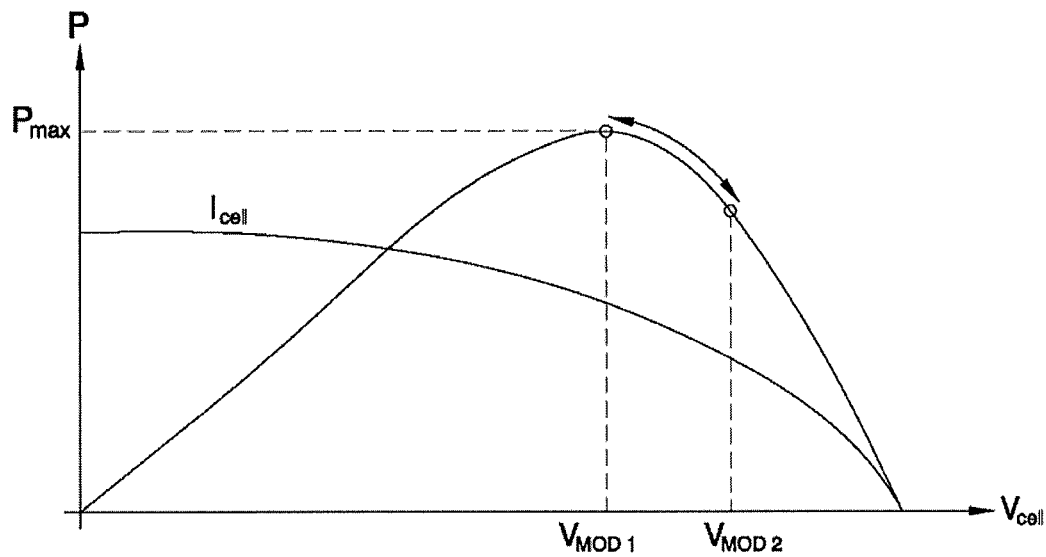
FIG. 1 shows a graph of the characteristic P-V of a solar cell.
Figure 2:
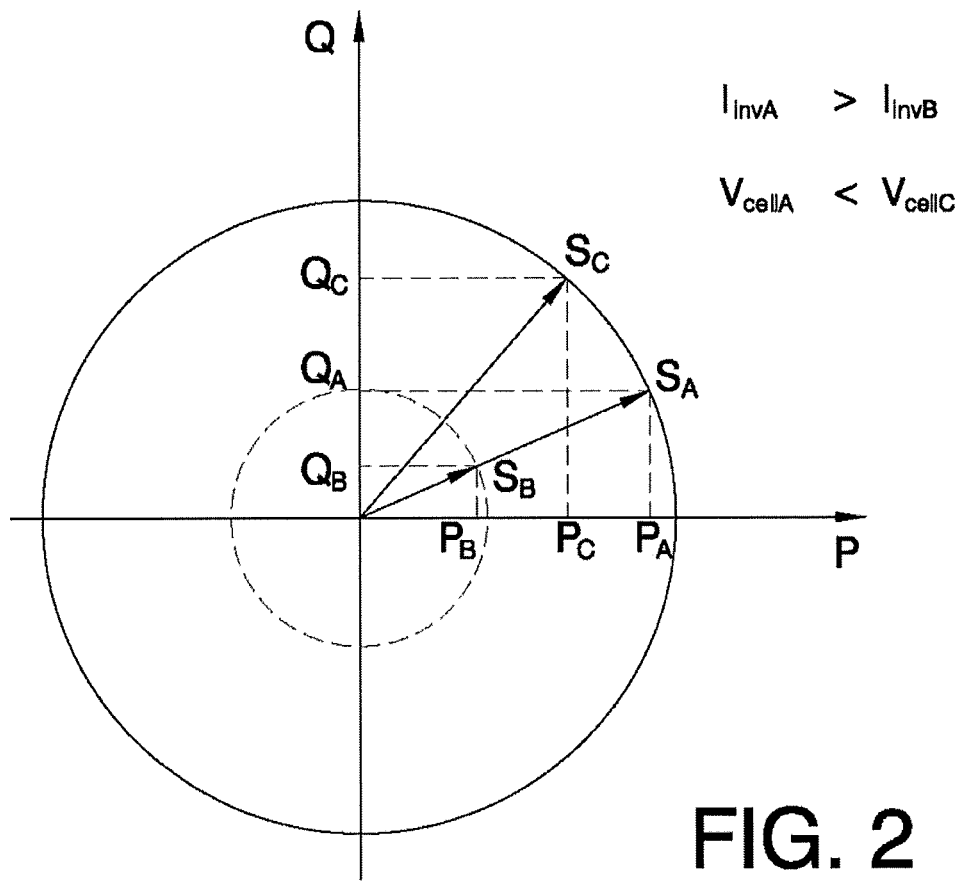
FIG. 2 shows a phase diagram where the variations in the active and reactive power as a function of the voltage of the solar cells and the intensity of the inverter can be seen.
Figure 3:
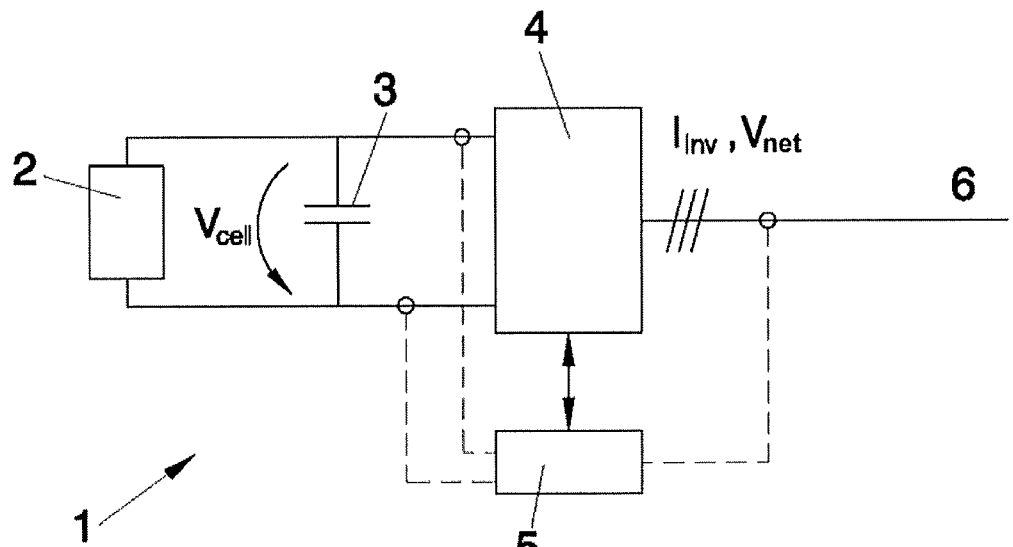
FIG. 3 shows a diagram of a solar generation system in accordance with the present invention.

Specific examples of the system and the method of the invention are described below by referring to the attached figures. In particular, FIG. 3 shows a diagram of a solar generation system (1) in accordance with the invention, where the different elements that make it up can be seen: a set of solar cells (2) connected to an inverter (4), which transmits the power generated to the electrical network (6). A controller (5) receives information about the electrical network (6) conditions and the voltage ($V_{cell}$) at terminals of the solar cells (2) in order to adequately control the inverter (4). Moreover, a condenser (3) is placed in parallel between the solar cells (2) and the inverter (4), such that any variation in the voltage ($V_{cell}$) of the solar cells (2) leads to the charging and discharging thereof.

Figure 4:
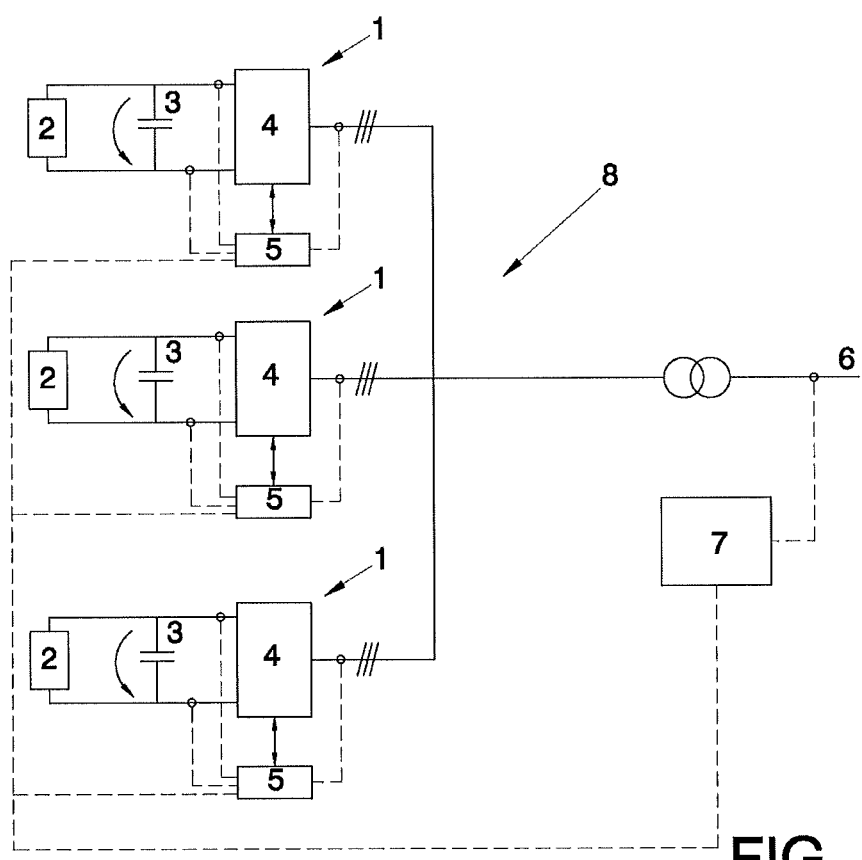
FIG. 4 shows a diagram of a solar generation plant in accordance with the present invention.

On the other hand, FIG. 4 shows a simplified diagram of a solar generation plant (8) formed by a set of systems (1) like the preceding one. In this example, three systems (1) have been represented in parallel, each of which may be controlled from a central control unit (7) connected to each of the controllers (5) of the inverters (4) of the respective systems.

Figure 5:
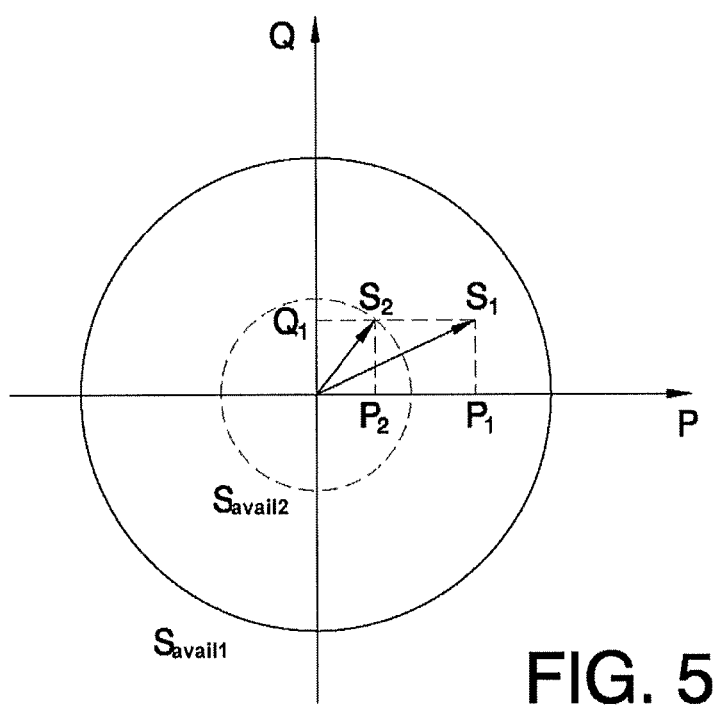
FIG. 5 shows an application example of the invention.

FIG. 5 shows an example of the method of the invention that may be performed by a system (1) such as that in FIG. 3. At a given time, there is an available power $S_{avail1}$, generating an active power $P_1$, which is the maximum possible active power under the current irradiance and temperature conditions, and a reactive power suitable for the electrical network (6) requirements at that time. Note that apparent power $S_1$ is lower than available apparent power $S_{avail1}$.

If, at a given time, the network voltage decreases, the available power decreases to $S_{avail2}$, which is a lower value than $S_1$. In order to continue supplying reactive power $Q_1$ to the electrical network (6), it is necessary to modify the voltage of the solar cells (2), decreasing the active power generated, which becomes $P_2$, and maintaining the required reactive power generation despite the decrease in the electrical network (6) voltage ($V_{net}$).

Figure 6:
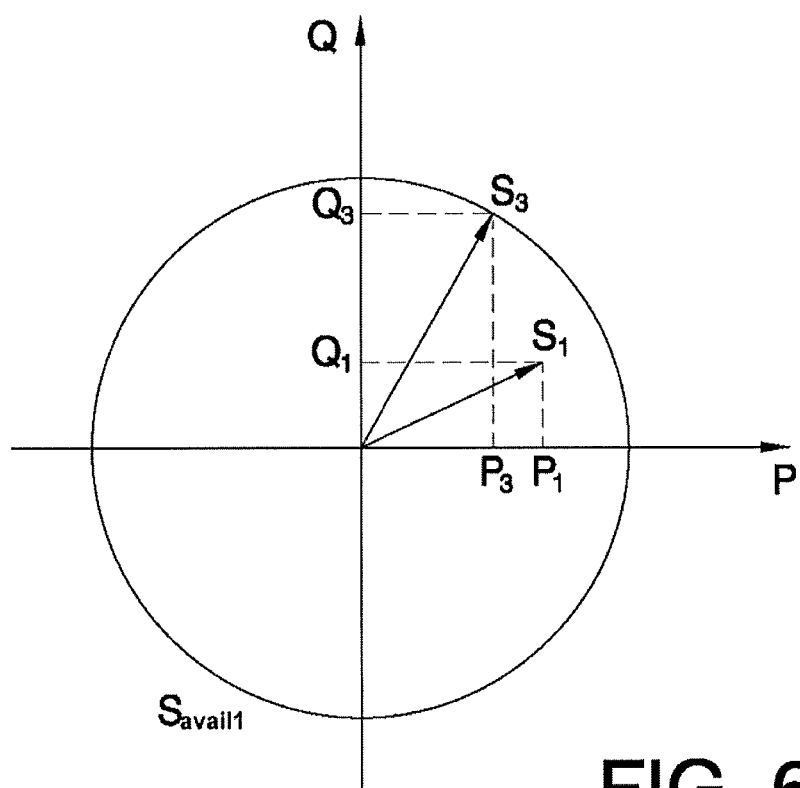
FIG. 6 shows another application example of the invention.

FIG. 6 shows another application example of the invention under similar starting conditions. The available power is $S_{avail1}$ and an active power $P_1$, which is the maximum possible power under those conditions, and a reactive power $Q_1$ are being generated. Apparent power $S_1$ is lower than the available apparent power.

At a given time, due to the measurements taken in the electrical network (6) or the signals sent from a central control unit (7), it may be necessary to significantly increase the reactive power, which becomes $Q_3$. In order to address this demand without exceeding available apparent power $S_{avail1}$, it is necessary to decrease the active power generated, which will become $P_3$, and to increase the intensity $(I_{inv})$ at the output of the inverter (4).

Under certain conditions, the situation will be a combination of the examples presented above. Thus, for example, a voltage dip considerably decreases the available apparent power and increases the reactive power production requirements. Similarly, an overvoltage demands a consumption of reactive power that may make it necessary to decrease the active power generated.

Below we describe an example of the calculation of the final reactive power $(Q_{ref})$ instructions, which may be performed by the control units (5) in each generation system (1), by the central control unit (7) of an entire generation plant (8), or by a combination of both.

In a first embodiment, the control unit (5) of the inverter (4) is capable of calculating the final reactive power instructions $(Q_{ref})$ on the basis of the electrical network (6) voltage as locally measured. In this case, the control unit (5) comprises a conventional regulator which calculates the final reactive power instructions $(Q_{ref})$ on the basis of the difference between the measured voltage $(V_{meas})$ and a voltage signal $(V_{ref})$.

In another preferred embodiment, the central control unit (7) measures the voltage $(V_{cmeas})$ or the power factor at the point where the solar generation plant (8) is connected to the electrical network (6) and, on the basis of this value, calculates the reactive power instructions for the different generation systems (1). In this case, the central control unit (7) comprises a conventional regulator that calculates the reactive power instructions $(Q_{cref})$ on the basis of the difference between the measured voltage or power factor and a voltage signal $(V_{cref})$ or power factor signal, and sends them to the control units (5) in the different generation systems (1).

In another alternative embodiment, local control of the voltage at the generation system (1) level, implemented by the control device (5), is combined with control of the voltage or power factor at the generation plant level (8), implemented by the central control unit (7). On the basis of the required reactive power $(Q_{cref})$ to be generated by the system (1) and the reactive power $(Q_{meas})$ measured by means of a regulator (21), the instructions for the local voltage $(V_{ref})$ at the terminals of the generation system (1) are generated. Preferably, the voltage controls in the generation system (1) are quick, in order to address sudden changes in voltage, whereas the voltage or power factor controls at the generation plant (8) level are slower and serve to adjust the performance of the entire plant (8).

Once the reactive power instructions $(Q_{ref})$ for the solar generation system (1) have been calculated by means of any of the alternatives presented and the available apparent power $(S_{avail})$ has been calculated as described above, an active power $(P_{ref})$ signal for the system (1) is calculated.

$$P_{ref} = \sqrt{S_{avail}^2 - Q_{ref}^2}$$

If, due to the environmental conditions, the active power generated by the system (1) exceeds said instructions, in a preferred embodiment switching to the second mode of operation will occur, modifying the voltage of the cells (2).

The generation of reactive power by a solar generation plant may be performed even in the absence of active generation, for example at night.

Finally, we describe an operation example for a generation plant (8) where the electrical network (6) operator requires a power reserve from the solar generation plant (8), i.e., that it generate an active power lower than the available active power. For example, it could require that, for a certain period of time, the plant (8) generate a power that is 2% lower than the available active power. As explained above, requiring a 2% power reduction from a generation system entails the difficulty that it is not simple for a generation system (1), once it reduces the power generated by switching to the second mode of operation, to know the maximum power that it could generate. In accordance with a preferred embodiment, the plant's (8) central control unit (7) makes a first group of systems (1) to operate in the first mode of operation and a second group of systems (1) to operate in the second mode of operation. Let us assume, for example, that the first group of systems (1) is composed of half the generation systems (1) that make up the plant (8), and, furthermore, that said first group is uniformly distributed throughout the plant (8). In accordance with this example, the available active power for the entire generation plant (8) may be quite accurately estimated as twice the active power produced by the first group of systems (1).

On the basis of this figure and the power reduction requirement for the entire plant (8), the central control unit (7) calculates and sends active power reduction signals to the second group of systems (1). Taking up the preceding example, if a 2% power reduction is requested for the entire plant (8), signals will be sent to the systems (1) that make up the second group of systems (1) such that said second group produces, overall, 48% of the available active power in the entire plant (8). In this manner, adding the production of the two groups of systems (1), the result is 98% of the available active power, thereby fulfilling the operator's requirement.

As may be expected, should any system (1) be out of service, this will be taken into account in the calculation of the available active power and the consequent active power signals.

The invention claimed is:

1. A solar generation method using a solar generation system comprising one or more solar cells connected to an inverter, the method comprising:
   transmitting an active power and a reactive power generated by the solar generation system to an electrical network;
   controlling the active power and the reactive power that the solar generation system transmits to the electrical network by controlling a voltage (Vcell) of the one or more solar cells and a current (Iinv) at an output of the inverter, such that:
   in a first mode of operation, a first value of the voltage (Vcell) of the one or more solar cells provides a maximum of the active power in accordance with operating conditions of the electrical network; and
   in a second mode of operation, a second value of the voltage (Vcell) of the one or more solar cells is different from the first value of the voltage (Vcell) that provides the maximum of the active power, thereby generating the active power to be lower than the maximum; and
   switching from the first mode of operation to the second mode of operation based on a detection of either:
   an increase in an electrical network frequency above a pre-established threshold frequency value, a derivative of the electrical network frequency with respect to time that is above a pre-established threshold derivative value, or an electrical network voltage that is outside a pre-established voltage range, wherein the detection is performed by a control unit of the inverter or by a central control unit connected to multiple control units.

2. The solar generation method of claim 1, wherein the second value of the voltage (Vcell) of the one or more solar cells in the second mode of operation is greater than the voltage (Vcell) providing the maximum of the active power.

3. The solar generation method of claim 2, wherein switching from the first mode of operation to the second mode of operation comprises charging a capacitor arranged in parallel between the one or more solar cells and the inverter using part of the active power generated by the solar generation system.

4. The solar generation method of claim 3, wherein switching from the second mode of operation to the first mode of operation comprises discharging the capacitor, thereby transmitting a part of energy stored in the capacitor to the electrical network through the inverter.

5. The solar generation method of claim 1, wherein switching from the first mode of operation to the second mode of operation is performed in response to a detection of isolated operation in the solar generation system.

6. The solar generation method of claim 1, further comprising:

calculating an available apparent power as a product of a measured electrical network voltage and a maximum output current of the inverter; and calculating a future active power to be generated by the solar generation system based on a reactive power signal and the available apparent power.

7. The solar generation method of claim 6, wherein switching from the first mode of operation to the second mode of operation is performed in response to a generation of the active power by the solar generation system that is greater than an active power signal.

8. The solar generation method of in claim 1, further comprising a plurality of solar generation systems, each comprising one or more of the one or more solar cells connected to a respective inverter and a respective control unit, the plurality of solar generation systems comprising the solar generation system, each of the plurality of solar generation systems capable of operating in the first mode of operation or the second mode of operation, the method further comprising controlling a solar generation plant comprising the plurality of solar generation systems from the central control unit connected to the respective control unit of each of the plurality of solar generation systems.

9. The solar generation method of claim 8, wherein at least one of the plurality of solar generation systems in the solar generation plant switches from the first mode of operation to the second mode of operation in response to receipt of a signal from the central control unit.

10. The solar generation method of claim 9, wherein the signal from the central control unit is an active power signal.

11. The solar generation method of claim 9, wherein a first group of the plurality of solar generation systems operates in the first mode of operation and a second group of the plurality of solar generation systems operates in the second mode of operation, and wherein the central control unit calculates an active power signal for the second group of solar generation systems on the basis of a first active power generated by the first group of the plurality of solar generation systems and an active power reduction requirement for the solar generation plant.

12. The solar generation method as claimed in claim 11, wherein when there is an increase or decrease in the active power generated by the first group of solar generation systems, the active power signal& sent to the second group of solar generation systems is modified in an opposite direction, in order to smooth a variation in a total active power generated by the solar generation plant.

13. A solar generation system comprising:

an inverter comprising a control unit controlling an output intensity of the inverter;

one or more solar cells connected to the inverter, the inverter transmitting energy generated by the one or more solar cells to an electrical network, the control unit of the inverter further controlling a voltage (Vcell) of the one or more solar cells;

a condenser connected in parallel between the inverter and the one or more solar cells;

one or more controllable loads that co-ordinate operation of the one or more solar cells; and an active charge controller that co-ordinates supply operations for the one or more controllable loads, wherein the solar generation system has:

a first mode of operation where a first value of the voltage (Vcell) of the one or more solar cells provides a maximum possible active power in accordance with operating conditions of the electrical network at each time; and a second mode of operation where a second value of the voltage (Vcell) of the one or more solar cells is different from the first value of the voltage (Vcell) that provides the maximum possible active power, thereby generating an active power that is lower than the maximum possible active power, and wherein the control unit is configured for switching from the first mode of operation to the second mode of operation based on a detection of either:

an increase in an electrical network frequency above a pre-established threshold frequency value, a derivative of the electrical network frequency with respect to time that is above a pre-established threshold derivative value, or an electrical network voltage that is outside a pre-established voltage range, wherein the detection is performed by the control unit of the inverter or by a central control unit connected to multiple control units.

14. The solar generation system of claim 13, further comprising one or more sensors that provide information about conditions of the electrical network and about the one or more solar cells to the control unit in the inverter.

15. The solar generation system of claim 13, further comprising energy storage devices.

16. The solar generation system of claim 5, further comprising a storage controller that co-ordinates charging and discharging operations in the energy storage devices.

17. A solar generation plant comprising:

a plurality of solar generation systems connected to an electrical network, each of the plurality of solar generation systems comprising:

an inverter comprising a control unit controlling an output intensity of the inverter;

one or more solar cells connected to the inverter, the inverter transmitting energy generated by the one or more solar cells to the electrical network, the control unit of the inverter further controlling a voltage (Vcell) of the one or more solar cells;

a condenser connected in parallel between the inverter and the one or more solar cells;

one or more controllable loads that co-ordinate operation of the one or more solar cells; and an active charge controller that co-ordinates supply operations for the one or more controllable loads, wherein each of the plurality of solar generation systems comprises:
- a first mode of operation where a first value of the voltage (Vcell) of the one or more solar cells provides a maximum possible active power in accordance with operating conditions of the electrical network at each time; and
- a second mode of operation where a second value of the voltage (Vcell) of the one or more solar cells is different from the first value of the voltage (Vcell) that provides the maximum possible active power, thereby generating an active power that is lower than a maximum; and a central control unit connected to the control unit in the inverter in each of the plurality of solar generation systems, in order to transmit respective operation signals thereto based on electrical network conditions or based on electrical network operator requirements, wherein the central control unit is configured for switching at least one of the plurality of solar generation systems from the first mode of operation to the second mode of operation based on a detection of either:
- an increase in an electrical network frequency above a pre-established threshold frequency value,
- a derivative of the electrical network frequency with respect to time that is above a pre-established threshold derivative value, or
- an electrical network voltage that is outside a pre-established voltage range, wherein the detection is performed by the central control unit.

* * * * *